July 17, 1934.         E. J. W. RAGSDALE         1,966,933
STRUCTURAL ASSEMBLY AND METHOD OF ASSEMBLING THE SAME
Filed June 25, 1931         3 Sheets-Sheet 1

INVENTOR.
Earl J. W. Ragsdale
BY
John P. Tarbox
ATTORNEY.

July 17, 1934.  E. J. W. RAGSDALE  1,966,933
STRUCTURAL ASSEMBLY AND METHOD OF ASSEMBLING THE SAME
Filed June 25, 1931  3 Sheets-Sheet 2

INVENTOR.
EARL J. W. RAGSDALE.
BY John P. Tarbox
ATTORNEY.

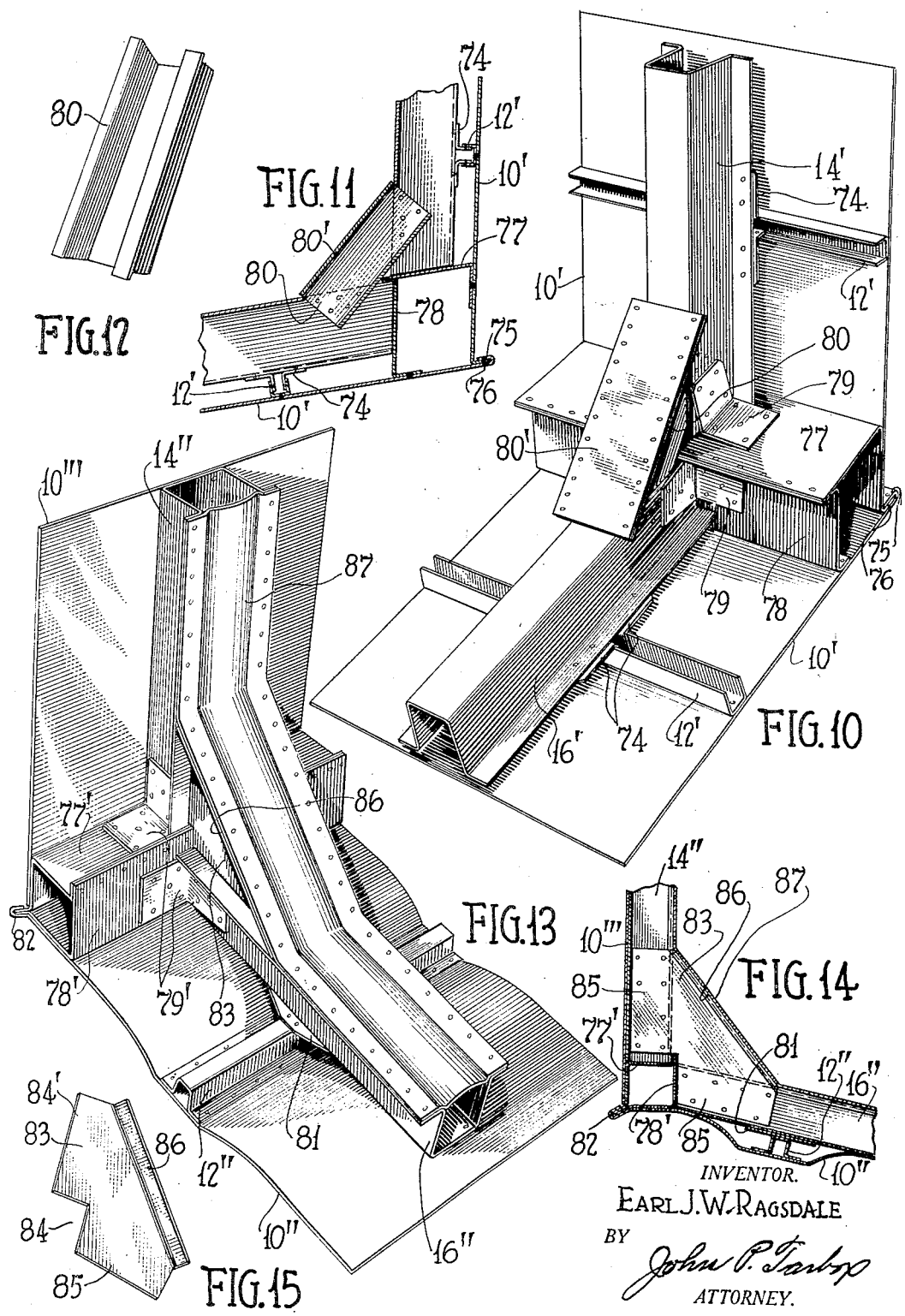

Patented July 17, 1934

1,966,933

UNITED STATES PATENT OFFICE 1,966,933

STRUCTURAL ASSEMBLY AND METHOD OF ASSEMBLING THE SAME

Earl J. W. Ragsdale, Norristown, Pa., assignor to Edward G. Budd Manufacturing Co., Philadelphia, Pa., a corporation of Pennsylvania Application June 25, 1931, Serial No. 546,722

REISSUED

11 Claims. (Cl. 114—79)

The invention relates to stream-line metal body constructions and to a method of manufacture of such bodies, as boats, pontoons, aeroplane fuselages and the like.

Experience with the building of such bodies as heretofore constructed indicates that the proper alignment of the transverse frame members and the positioning of the longitudinal members called stringers, consume more time than the fabrication of these members. Even under the most favorable conditions, the skin or sheathing will not absolutely conform to the contacting members of the skeleton frame. A troublesome and unsightly surface results.

It is a main object of the invention to overcome these difficulties by providing a construction and method of manufacture in which the body to be constructed is arbitrarily divided along lines extending longitudinally thereof into transversely separated longitudinally extending sections, these sections being separately fabricated complete with sheathing and associated framework, after which the sections are joined together along the longitudinally extending lines of arbitrary division.

The invention further comprehends the structural features whereby this method of manufacture is facilitated and whereby a strong, light metal streamline body results. Such structural features include the edge conformation of the sheathing of the adjacent sections and the manner in which the transverse frame and longitudinal members are formed to permit their easy and rapid joinder, as by spot welding.

This method and construction is particularly applicable to metal streamline bodies in which the skin and framework are made of light gauge metal stock, such as stainless steel, which has the desirable features of great strength, non-corrodability, and ease of joinder by spot welding.

Other and further objects and advantages will become apparent from the following detailed description, when read in connection with drawings forming a part of this specification.

In the drawings, the invention is shown applied to the construction of a flying coat particularly adapted for use in glider construction. It will be obvious that it is equally applicable with minor variations to other streamline hollow body constructions.

In the drawings,

Fig. 10 is a fragmentary perspective view of the longitudinal and transverse joint connecting the longitudinal sections of a modified body construction.

Fig. 11 is a transverse sectional view through the joint of Fig. 10, and

Fig. 12 is a perspective view of a diagonal structural element joining adjacent ends of the transverse frames.

Figs. 13, 14 and 15 are views corresponding to Figs. 10, 11 and 12, of a still further modification.

Figure 1:
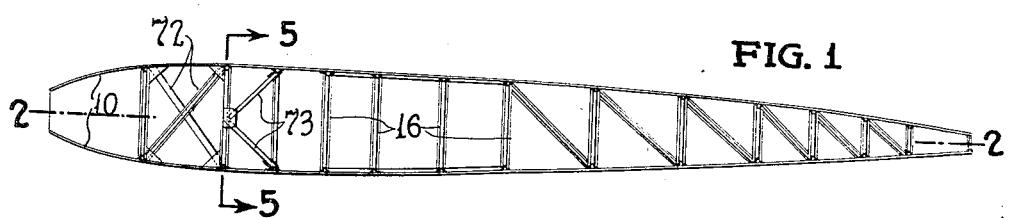
Fig. 1 is a top plan view of a boat manufactured in accordance with the invention with the top removed.
Figure 2:
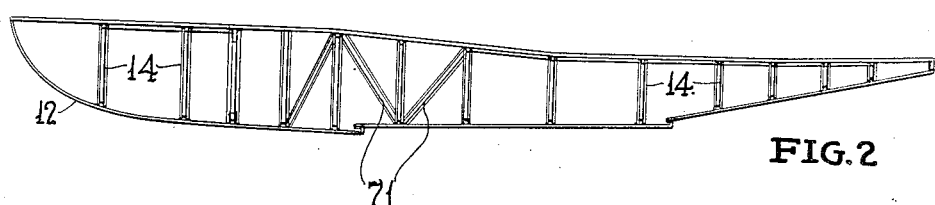
Fig. 2 is a sectional side elevation thereof taken on the line 2—2 of Fig. 1.
Figure 3:
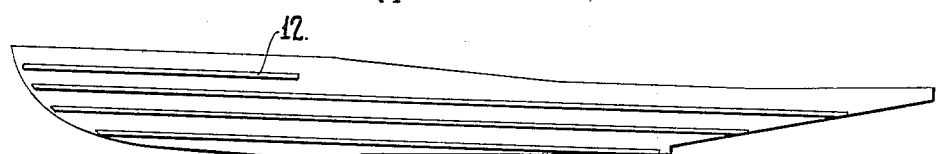
Fig. 3 is a side elevation and Fig. 4 is a bottom plan thereof.
Figure 4:

The drawings (Figs. 1 to 9) show a boat assembly and this boat is shown as being constructed entirely of light sheet material as stainless steel, in the form of a frame of the proper shape, which frame has secured thereto a covering skin, or sheathing 10. A number of outside stringers or keelsons 12 of inwardly presenting channel-section are provided longitudinally of the boat on the sides, bottom and top of the same. The boat is provided with a number of transverse inside frames consisting of vertical members 14 and horizontal members 16 of channel-section having flanges 18 for attachment to the covering 10 by means of spot welds designated at 19. The corner joint of each frame is formed according to the showing in Fig. 6 and is in the form of a diagonal brace, in this instance, a two-part split gusset.

The gusset consists in two sections, each of which sections comprise a pair of plates 27, 27' and 26, 26', respectively. Each plate has an edge, which edges when the gusset is assembled are inclined so that they may be positioned on the horizontal and vertical frame members 16 and 14 with the axes of the plates in alignment. The two sections of the gusset are independently positioned on the members 16 and 14 with edges of the plates abutting the flanges 18 of the transverse and vertical members and with the areas adjacent these edges at the ends of the plates welded to the structural member on opposite sides thereof.

Figure 7:
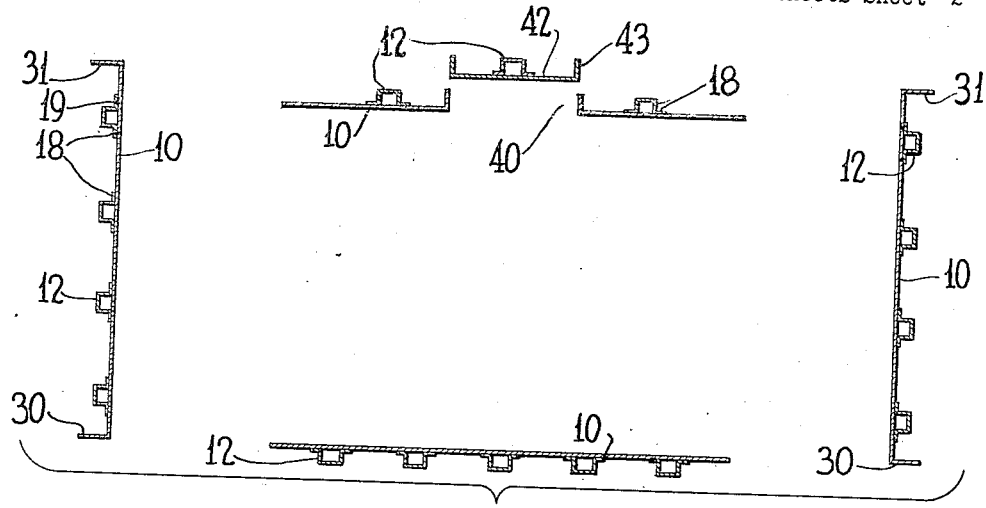
Figs. 7 and 8 are exploded sectional views showing the method of assembly of the sections prior to their assembly into the complete body.
Figure 8:
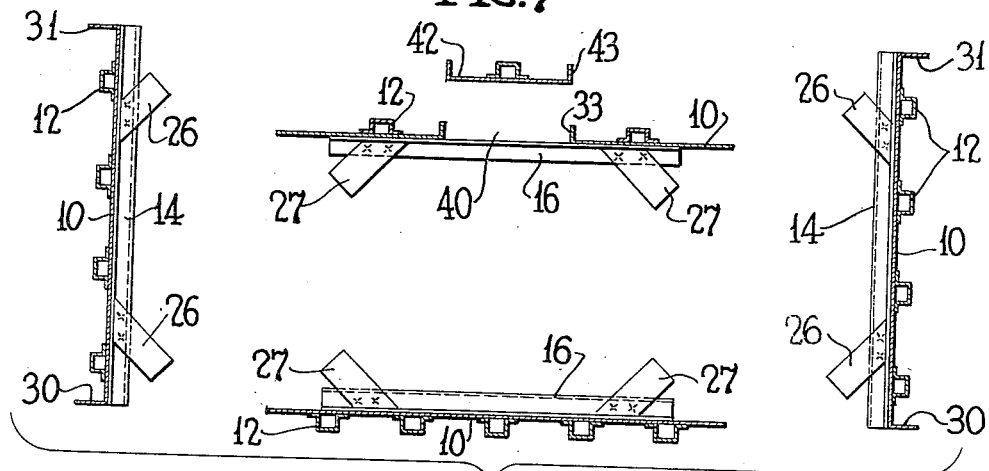
Figure 9:
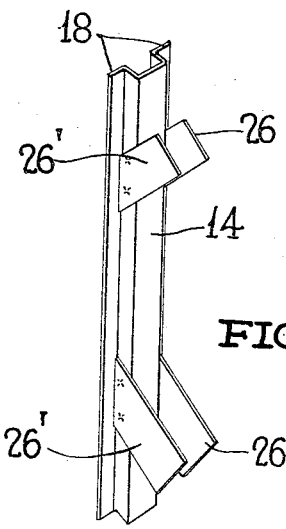
Fig. 9 is a perspective view of a structural unit employed in the construction.

In Figs. 7 and 8, the method of assembling the boat structure is disclosed. The outside stringers 12 on the bottom of the boat are assembled on the bottom covering or sheathing as are the inside transverse frame members 16 by spot welding the flanges of the stringers to the covering. The sections 27 of the gusset are positioned and properly oriented on the transverse member 16 and welded thereto as shown. Similarly, the side portions of the boat including the covering or sheathing 10, outside stringers 12, vertical frame members 14, and the sections 26 of the gusset, are positioned in such a manner that the gusset sections 26 and 27 are properly overlapped when the sides of the boat are assembled on the bottom. The covering 10 on each side of the boat is provided with lateral flanges 30 and 31 adjacent its lower and upper edges respectively. The flanges 30 are adapted to seat squarely on the covering 10 of the bottom section of the boat. When the sides are assembled on the bottom, these flanges 30, 31 are welded to the covering 10 of the bottom and the overlapping portions of the gusset sections 26 and 27 are also welded together.

In order to strengthen the gusset sections a reinforcing member 50 of channel shape cross section is inserted between the parallel plates of the gusset section. This reinforcing member is provided with side flanges 52 each having an inwardly extending offset portion 54 to accommodate the offset overlapped portions 28 of the gussets. The sides 52 of this reinforcing member 50 are suitably welded, as shown, to the plates, thus a very rigid structure is attained.

The upper section of the boat is also independently assembled. The covering 10 is assembled on the transverse frame members 16. This covering extends inwardly of the frame member 16 a substantial distance and is provided with inner upturned flanges 33. The outside stringers 12 are also included in this assembly. The sections 27 of the gusset are positioned on the transverse frame member 16 so that they will engage the upper gusset sections 26 on the side members when the assembly is completed. The upper section of the boat is then assembled upon the side sections, and the flanges 31 are spot welded to the edges of the sheathing material 10 on the upper boat section. The upper sheathing 10 not being continuous but being provided with a central opening 40 permits access to the interior of the boat structure for welding the overlapped portions 28 of the upper gussets. A closing section is designated at 42. This closing section consists of a sheet of material having upturned flanges 43 adapted to be welded to the flanges 33 to complete the closure of the boat structure. If desired, the outside stringer 12 may be secured longitudinally of the closing section 42 for the purpose of reinforcing the same prior to the assembly of the closing section in the boat structure, as indicated in Fig. 7.

The boat is generally shaped in the form of a streamline body, to which this structure is generally adapted and has a pointed bow 60, a widened portion 62 and a tapering stern 64. The transverse frames which cooperate to make up the boat structure are designed according to the respective positions which they occupy in the boat structure. Thus the size of the frames located in the widened portion, as for example, where the section 5—5 if taken in Fig. 1, would be comparatively larger than the frames in the relatively small stern section, although the construction of these frames is substantially the same. In the assembly of the separate longitudinal sections the sheathing or covering is held in a suitable jig to the desired curvature. Then the outside stringers 12 and the interior frame members 14 and 16, suitably contoured, are secured to the sheathing. This fixes the curvature of the sheathing of the sections to the exact shape, so that in the final assembly the edge conformations through which the sections are joined will match.

Figure 5:
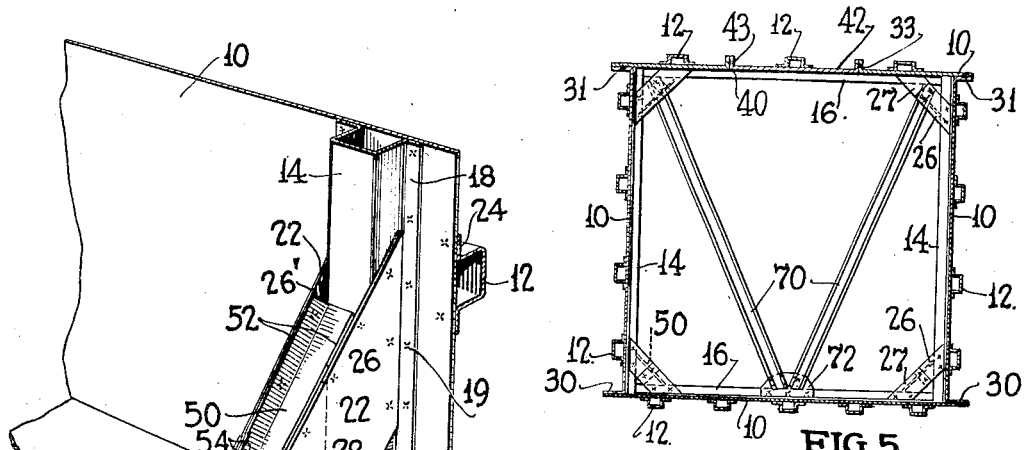
Fig. 5 is a detail transverse sectional view taken substantially along the line 5—5 of Fig. 1.
Figure 6:
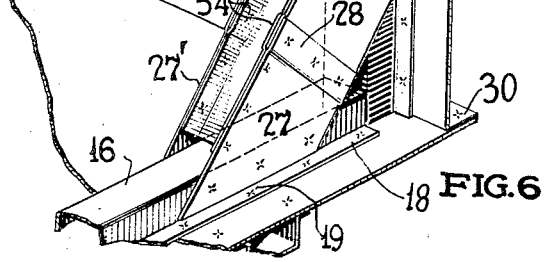
Fig. 6 is a fragmentary perspective view showing one form of diagonal joint member joining the vertical and horizontal frame members of adjacent longitudinal sections of the boat.

Suitable trussing may be provided if desired for reinforcing the entire boat construction, and as shown in Fig. 5, this trussing is designated at 70 and comprises a plurality of diagonals having their lower ends secured between the two flat gusset plates 72 welded to the opposite sides of the transverse member 16. These diagonals extend upwardly toward the upper corners of the boat structure and are suitably welded to the parallel plates of the corner gussets. Where these struts or diagonals are employed the reinforcing members 50 are omitted in order to permit insertion of the diagonal members 70 between the plates of the gusset members. The members 70 are positioned between the gusset plates and perform the function of the reinforcing members 50. Longitudinally extending diagonal struts 71, Fig. 2, and transverse diagonal struts as 72, 73, Fig. 1, further stiffen the structure in regions where this is desired for taking up the stresses to which the particular structure in which the invention is embodied is subjected in use.

In the modified construction shown in Figs. 10 to 12, the adjacent longitudinally extending sections which are sub-assembled prior to the final assembly comprise the smooth outer sheathing sections 10', the longitudinal stringers 12' having their bases disposed against the inner face of the skin, the transverse frame members 14' and 16' of flanger channel section facing outwardly and secured to the longitudinal stringers 12' through angle brackets 74 spot welded through one arm to the flanges of the channels 14' and 16' and through the other arm to the side walls of the channel stringers. This bracket connection permits flexibility of the connection between the stringers and transverse frame members allowing for tilting of the frame members with respect to the skin to various angles dependent upon longitudinal location of the transverse members in the streamline structure.

The chines or regions of joinder of two longitudinal sections are in this modification reinforced by closed section chine stringers of quadrangular cross section, the outboard angle of which is comprised of portions of the skin or sheathing 10' secured together by crimping one at 75 over an edge flange 76 of the other, and spot welding the parts together in the crimped joint. The inboard angle is comprised of separate longitudinal strips 77 and 78, one of which as 77, may be of angle section having one arm welded to the one sheathing section 10' and the other, as 78, may be of Z-section having one arm of the Z welded to the other sheathing section. The other arm of the Z overlaps and is welded in the final assembly to the inner edge of the inwardly extending arm of strip 77. The ends of the transverse frame members 14' and 16' abut respectively the strips 77 and 78 and are secured thereto by angle brackets 79 spot welded respectively to the side wall channels of said frame members and to the inwardly extending arms of the strips 77 and 78. All the joints so far described except the crimped joint 75, 76 and the joint between the strips 77, 78 can be readily made in the sub-assembly of the longitudinal sections out of which the complete body is built up. Ready accessibility is had by reason of the general openness of the construction, for joining the parts by spot welding.

In the final assembly the joints between 75 and 76 and the strips 77 and 78 are readily made by reason of the openness of the construction to form the closed box section chine stringers. The frame members 14' and 16' are interbraced by diagonal interconnecting members in the form of inwardly facing flanged channels 80 received telescopically within the opened up ends of the outwardly facing channels of the transverse frames 14' and 16' and spot welded to the side walls of the channels. These channels may be further strengthened by closing them with a closing strip 80' secured to the flanges of the channels.

According to the further modification shown in Figs. 13 to 15, still greater strength is secured, such as may be desirable in flying boat constructions. In this modification, a side and bottom section of a flying boat construction are shown in which the skin 10" of the bottom section is longitudinally fluted, and outwardly facing flanged channel longitudinal stringers 12" are secured through their flanges to the skin.

The bottom transverse frame members 16" are of inwardly presenting flanged channel section having their bases secured to the bottom of the longitudinal stringers either through intermediate gussets 81 as shown or directly without the intermediary of gussets. The bases of the transverse members are also secured at the bottoms of the flutes of the skin, directly to the skin. The fluted skin of the bottom and the connected frame members thus form a very strong and rigid bottom construction, well able to withstand the stresses of landing upon the water.

In this modification, the hollow quadrangular chine members connecting the side and bottom sections are formed jointly by the intersecting portions of the sheathing 10" and 10''' and intersecting arms of angle section stringer members 77' and 78'. The arms of angle member 77' are flanged and secured through the flanges to the edges of the arms of member 78' while the side sheathing 10'''' reinforced by the vertical transverse frames 14" similar to the bottom transverse frames 16' and secured to the sheathing in similar fashion, has its lower edge overlapping and secured to the vertical arm of the stringer member 77'. The bottom sheathing is similarly secured to the horizontal arm of stringer member 78' and has its extended edge crimped, at 82, over the overlapping and joined together outer edges of the members 77' and 78'. The transverse frame members 14" and 16" abut, respectively, the inner arms of the angle section stringer members 77' and 78' and are secured thereto by angle gusset members 79' similar to gussets 79 in the modification shown in Figs. 10 and 11. The diagonal braces connecting the frame members 14" and 16" are substantially flat gussets 83 shaped with an angular cut-out, as 84, to receive the inner angle of the hollow longitudinal chine stringer and have their wings 84' and 85 overlap the side walls of the channel section transverse frame members 14" and 16" and secured thereto. These gussets are flanged, at 86 in the direction of the flanges of the frame members and form with the flanges of the frame members substantially continuous flanges transversely of the boat body to which a continuous reinforcing strip as 87, may be secured by spot welding to form a closed box section transverse frame structure, providing increased strength and finish to the interior framing.

The several modifications shown indicate that the structure and method of the invention lends itself to considerable modification in the detail of the manner of reinforcing the sheathing and in other respects to adapt the advantages of the invention to various uses and it will be obvious that in its broad aspects the invention is not limited to the particular detailed structures shown, although these are all highly practical constructions and all well adapted for joinder throughout by the easiest method of joinder of sheet metal parts, namely, spot welding.

This invention is not limited in its application to boat structures, but can be advantageously employed in any hollow streamline body structure, such as fuselages, pontoons, etc.

In its broader aspects as claimed in certain of the attached claims, as well as in its narrow aspects, covered by other of the claims, it will be understood that modification and variation can be made by those skilled in this art, and such modifications and variations as clearly fall within the spirit and scope of the invention are intended to fall within the language and scope of the appended claims.

What I claim is:

1. A body construction having longitudinal sections thereof arranged at an angle comprising a hollow section, and a hollow longitudinal stringer along the angle between two adjoining sections, and hollow section transverse frame members secured to the walls of said longitudinal member, and a diagonal brace of hollow cross section having parts telescoping certain walls of the hollow section transverse frame members and secured thereto.

2. A body construction having longitudinal sections including sheathing and framing arranged at an angle to each other, said framing comprising a closed section longitudinal stringer in the angle between said sections, inwardly facing flanged channel section transverse frame members secured to said longitudinal stringer and sheathing spaced gussets joining the side walls of the transverse frame members adjacent their ends and having a diagonal flanged edge joining the flanged side walls of the channel, and a continuous strip closing member secured to the flanges of said frame members and the gussets and closing the channel section.

3. The combination with a pair of structural units having surfaces positioned at an angle with respect to each other, of a corner fastening therefor comprising a sectional gusset, one section of said gusset being welded to a surface of the structural unit and the other section of the gusset being welded to another surface of the structural unit, said sections overlapping each other and being welded together, whereby the structural units may be separately fabricated each including a section of the gusset and the complemental sections of the gussets may be overlapped in final assembly and thereupon be secured together for the first time.

4. In a structure characterized by a plurality of unit sub-assemblies, a corner fastening for securing sections of a structural assembly in position comprising a sectional gusset formed in two pieces, one section of the gusset being welded to a section of the assembly and the other section of the gusset being welded to another section of the assembly, said gussets overlapping and being welded to each other at their overlapped portions.

5. A corner fastening for securing the sections of a structural assembly together comprising a pair of plates each welded to surfaces of one section of the assembly, a second pair of surfaces of another section of the assembly, each plate of one pair overlapping a plate of the other pair and being welded thereto, and a reinforcing member extending bewteen the plates of each pair and being welded thereto.

6. The method of assembling hollow structural bodies which consists in first sub-assembling adjacent sides as separate sub-assembly units including skin, framing and attaching edge conformations and gussets, and then bringing the edges of the sub-assemblies together and welding them together through overlapping edge conformations and corner gussets in the final assembly.

7. The method of assembling hollow structural bodies, which consists in sub-assembling the adjacent sides in separate sub-assembly units including covering and reinforcing framing formed with edge conformations and corner gussets portions adapted to overlap corresponding edge conformations and gusset portions of an adjoining sub-assembly unit, then bringing said sub-assembly units into assembled relation with their edge conformations and corner gusset portions overlapping and spot welding the sub-assemblies together along these overlapped portions in the final assembly.

8. A sub assembly unit for a sheathed streamline body having a supporting framing adapted to be joined to a mating section in its margins and having its margins extending longitudinally of the longitudinal axis of the streamline body, which unit comprises sheathing and attached transverse framing together with attached sections of corner gussets of a length adapted to overlap and be secured to the remaining portions of corner gussets as attached to a similar such section.

9. The method of dividing a streamline body supported by transverse framing embodying corner gussets which consists in longitudinally dividing the body for the formation of sub-assembly joints along the corners of the framing and separately providing the transverse member of each sub-assembly so formed with a portion only of the corner gussets whereby the portions of the corner gussets on the respective sub-assemblies may be joined together in final assembly to form the completed corner gusset.

10. A streamline body construction built up of longitudinal sections contoured to the form of the completed body, each of said sections comprising longitudinal members, transverse members and sheathing adjacent sections secured together, the sheathing of one of said sections joined to the sheathing of the adjacent section, a longitudinal member of one section joined to an adjacent longitudinal member of said adjacent section independent of the joint of said sheathing and a transverse member of one section joined to a transverse member of said adjacent section independent of the joints of said longitudinal members and said sheathing.

11. The method of building streamline bodies embodying longitudinal and transverse framework members and sheathing, which comprises in separately fabricating transversely separated sections complete with sheathing and associated longitudinal and transverse framework members, and thereafter joining said sections together by joining the sheathing of adjacent sections, joining the adjacent longitudinal members of adjacent sections independent of the joint of said sheathing and joining the adjacent transverse members of adjacent sections independent of the joint of said sheathing and the joint of said longitudinal members.

EARL J. W. RAGSDALE.